(No Model.)
F. F. LANDIS.
DISCHARGER FOR PNEUMATIC STRAW ELEVATORS.
No. 512,557. Patented Jan. 9, 1894.
FIG_1_
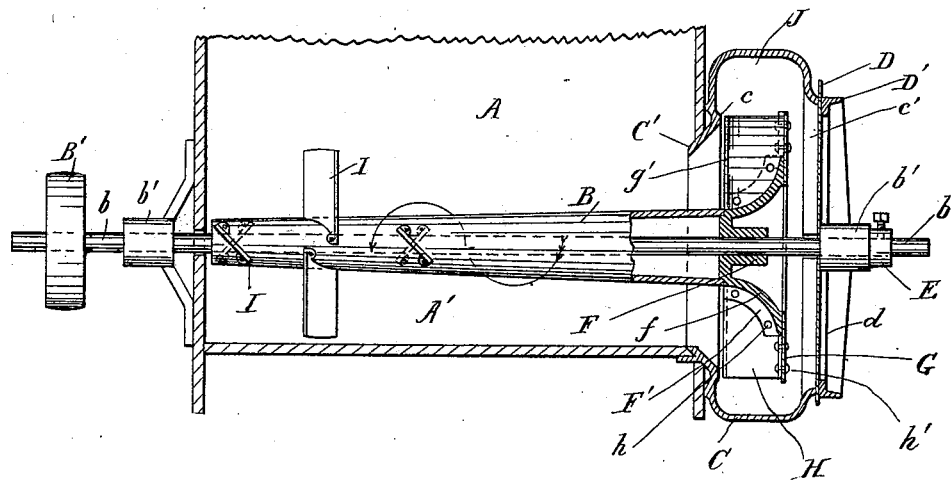
FIG_2_
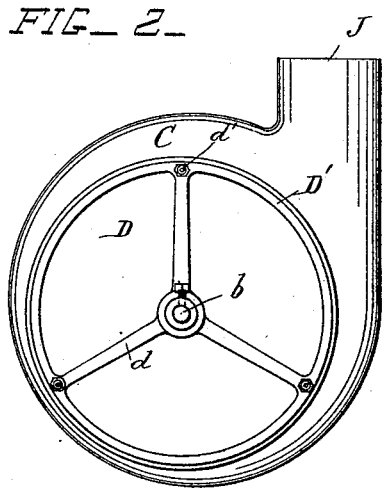
FIG_3_
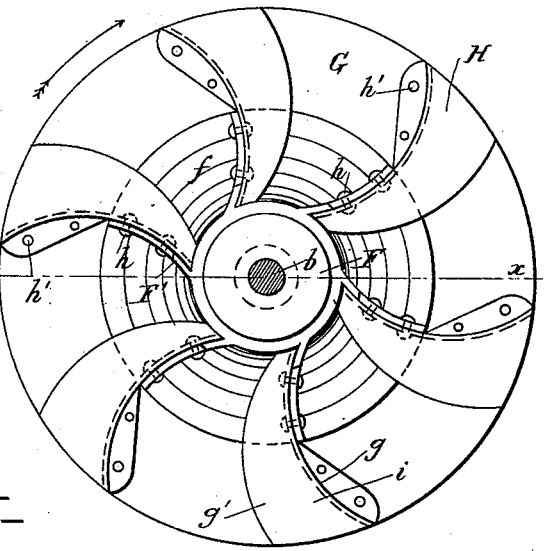
FIG_4_
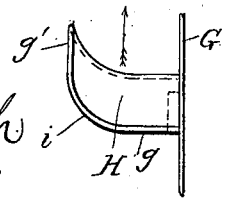
WITNESSES:
Chas. J. Gooch
Jno. F. Doran Jr.
INVENTOR
Frank F. Landis.
BY
Herbert W. T. Jenner
ATTORNEY.
THE NATIONAL LITHOGRAPHING COMPANY,
WASHINGTON, D. C.

UNITED STATES PATENT OFFICE.

FRANK F. LANDIS, OF WAYNESBOROUGH, PENNSYLVANIA.

DISCHARGER FOR PNEUMATIC STRAW-ELEVATORS.

SPECIFICATION forming part of Letters Patent No. 512,557, dated January 9, 1894.

Application filed August 8, 1893. Serial No. 482,664. (No model.)

*To all whom it may concern:*

Be it known that I, FRANK F. LANDIS, a citizen of the United States, residing at Waynesborough, in the county of Franklin and State of Pennsylvania, have invented certain new and useful Improvements in Dischargers for Pneumatic Straw-Elevators; and I do hereby declare the following to be a full, clear, and exact description of the invention, such as will enable others skilled in the art to which it appertains to make and use the same.

This invention relates to dischargers used in thrashing machines in connection with the pneumatic straw elevators and stackers; and it consists in the novel construction and combination of the parts hereinafter fully described and claimed.

In the drawings: Figure 1 is a sectional plan view of the discharger fan taken on the line $x$ $x$ in Fig. 3 and showing the discharger casing and a portion of the separator casing. Fig. 2 is a side view of the discharger casing. Fig. 3 is a detail side view of the discharger. Fig. 4 is a detail end view of one blade.

A are portions of the casing of a grain separator which form a chamber A' into which the straw passes after the grain has been removed from it.

B is a conical barrel secured on the shaft $b$ which is journaled in the bearings $b'$ and revolved by the belt pulley B'.

C is the discharger casing secured to the side of the separator casing. The discharger casing is provided with a conical inlet C' connecting it with the straw chamber, and $c$ is a projecting lip forming a ring inside the casing in close proximity to the blades of the discharger.

J is the outlet which is connected to the stacker.

The discharger casing has an opening $c'$ through which the discharger is inserted, and D is a thin plate of sheet metal for closing the opening.

D' is a ring provided with arms $d$ and a central hub for supporting one of the bearings $b'$. This ring and the plate D are secured to the discharger casing by the bolts $d'$.

E is a collar secured to the end of the discharger shaft. This collar runs against the end of the shaft bearing and prevents the discharger blades from touching the lip $c$, but permits them to be moved away from it. The pressure of the air behind the discharger inside the casing normally holds the fan pressed toward the said lip.

The discharger consists of a hub F secured on the shaft $b$ and provided with the concave plate $f$.

F' are small curved flanges, substantially radial, and projecting from the concave plate $f$.

G is a disk secured to one end of the plate $f$. This disk forms the back of the discharger. The barrel B joins onto the smaller end of the plate $f$ and the disk G is secured to its larger end.

H are the blades of the discharger secured to the flanges F' by the bolts or rivets $h$, and to the disk G by the bolts or rivets $h'$. These blades are curved rearwardly in the opposite direction from their direction of revolution, which is indicated by the arrows. The blades H each consist of a portion $g$ arranged at right angles to the disk G, a portion $g'$ parallel with the disk G, and a curved portion $i$ uniting the said portions $g$ and $g'$.

The hub, the disk, and the blades may all be cast in one piece, if desired instead of being secured together.

I are inclined wings bolted to the barrel at one end and adapted to feed the small rubbish, which would otherwise accumulate in the chamber, toward the inlet C'. The air and straw drawn into the discharger are forced up the outlet pipe by the action of the revolving discharger. The portions $g'$ of the blades catch the straw and the rearwardly-curved portions $i$ and $g$ discharge it up the discharge pipe. The straw is flung off by the discharger blades at the same velocity as the air and is kept in motion by the blast of air thrown off with it by the discharger. When a bunch of straw strikes the part $g'$ of a blade and is drawn between the part $g'$ and the lip $c$, the discharger slides automatically away from the lip and permits the straw to pass. The discharger then resumes its original position automatically. The straw which is drawn in near the center of the discharger is caught by the portions $g'$ which prevent it from being thrown back into the inlet C' near the periphery of the discharger. It is found that by constructing the discharger blades in this manner the discharger will do the same amount of work when driven at a less velocity than when the blades are constructed without the portions $g'$ and $i$ which form channels in their faces.

What I claim is—

1. A discharger provided with a central hub having a concave plate, a flat circular disk at the larger end of the said plate, and a series of rearwardly curved blades each provided with a portion $g$ substantially at right angles to the disk, a portion $g'$ substantially parallel with the disk and a curved portion $i$ connecting the portions $g$ and $g'$, substantially as set forth.

2. A discharger provided with a hub, a disk on one side, and a series of rearwardly curved blades, each said blade being provided with a portion substantially parallel to the disk and forming, together with the disk, a channel which constitutes the front face of the blade, substantially as set forth.

3. The combination, with the chamber for receiving the straw, of the longitudinally movable discharger shaft, a barrel secured on the said shaft inside the said chamber and provided with inclined projecting wings, the discharger casing provided with a conical inlet and a projecting annular lip, a discharger secured on the said shaft and provided with a flat disk on one side, and a collar secured on the said shaft and preventing the discharger from touching the said lip, substantially as set forth.

4. The combination, with the discharger, of the discharger casing provided with an inlet on one side and an opening for inserting the discharger on the other side, a plate closing the said opening, a ring provided with arms and a hub for supporting one of the discharger shaft bearings, and bolts securing the said ring and plate to the casing, substantially as set forth.

5. The combination, with the discharger, of the discharger casing provided with an inlet on one side and an opening for inserting the discharger on the other side, a removable cover plate closing the said opening, and means for securing the cover plate to the casing, substantially as set forth.

In testimony whereof I affix my signature in presence of two witnesses.

FRANK F. LANDIS.

Witnesses:
  HERBERT W. T. JENNER,
  ALF. N. RUSSELL.